Nov. 6, 1951      J. A. VICTOREEN      2,574,000

IONIZATION AND VACUUM TUBE CHAMBER

Filed March 27, 1947

INVENTOR.

JOHN A. VICTOREEN

BY *J. D. Douglas*

Patented Nov. 6, 1951

2,574,000

UNITED STATES PATENT OFFICE 2,574,000

IONIZATION AND VACUUM TUBE CHAMBER

John A. Victoreen, Cleveland, Ohio, assignor to Victoreen Instrument Company, Cleveland, Ohio Application March 27, 1947, Serial No. 737,579

8 Claims. (Cl. 313—93)

This invention relates to measuring instruments and more particularly to instruments for determining the presence and quantity of radiations, such as X-rays or radiations from radio active material.

It has become common practice to measure or determine the presence of rays, such as X-rays or the like, by providing an ionization chamber which may fundamentally be a condenser, the charge of which is varied by the ionization of a predetermined volume of gas, such as air, and which charge is measured by a circuit including vacuum tubes connected thereto.

Inasmuch as the ionization chamber is one of the critical components of such a system, it becomes desirable to provide one which will retain certain fixed characteristics over long periods of time under various conditions of temperatures, air pressure and humidity. This problem becomes increasingly difficult when it is appreciated that measurements may be conducted in various places where conditions depart radically from those normally maintained in a laboratory.

By my present invention I have provided an ionization chamber which is extremely rugged, substantially impervious to moisture and changes in air pressure. Another advantage resides in providing an ionization chamber wherein the first tube of an electronic measuring circuit is incorporated in the chamber, eliminating the need for long connector leads and their concomitant difficulties of insulation and isolation.

Another advantage of the invention is that the ionization chamber may be removed for replacements as a unit in the same manner that a conventional vacuum tube is removed from a socket. Still another advantage resides in the fact that the design is such as to eliminate all undesirable avenues of ionization, and the ionization is confined to predetermined places eliminating the possibility of errors which have heretofore occurred because ionization took place in unwanted portions of the apparatus.

Still other advantages of the invention, and the invention itself will become more apparent from the following description of an embodiment thereof, which description is illustrated by the accompanying drawings and forms a part of this specification.

Figure 1:
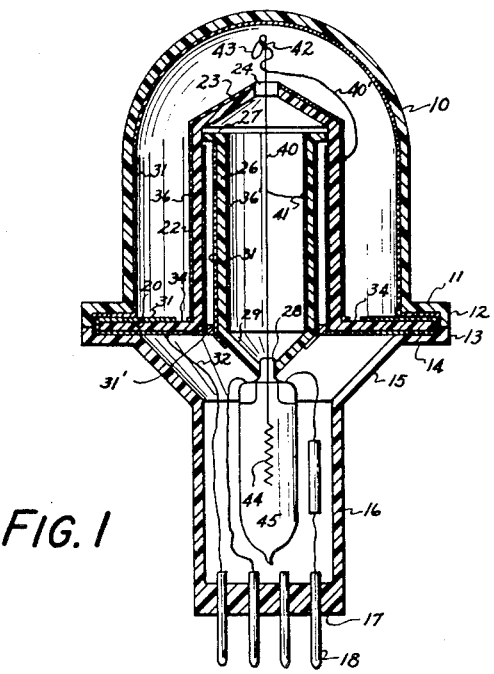
Fig. 1 is a vertical medial sectional view of an ionization chamber of my invention.

Briefly, the invention includes a housing of moisture-proof plastic, the upper portion of which constitutes an ionization chamber and the lower part of which houses a vacuum tube which may be of the electrometer type. The lower portion is provided with a base having pins extending therethrough adapted for engagement in a conventional tube socket.

More specifically, the housing is formed in two parts, the upper portion 10 being in the form of an inverted bowl, provided at its base with an outwardly extending peripheral flange 11, the extremity 12 of which turns downward.

The lower portion is provided with an upturned rim 13 which is disposed on the periphery of a flange 14 connected by a conical section 15 to the cylindrical bottom portion 16. The lower end of the cylindrical part is closed by a wall 17 through which the connector pins 18 extend in sealed relation. The parts 15—17 comprise a chamber which houses the vacuum tube and its associated circuit components. The rims 12 and 13 and the flanges 11 and 14 form an annular recess in which is supported the inner electrode member.

The inner electrode member is formed with a base flange 20, which has a snug fit between the flanges 11 and 14, and is also formed with an upwardly extending cylindrical portion 22, the top end of which is partially closed by a conical wall 23, a central opening being provided through the wall at 24.

Inside of the cylinder 22, there is disposed another cylinder 26 which is held in spaced relation to the cylinder 22 by an outwardly extending flange 27 on its upper end adapted to engage the inner walls of the cylinder 22. The lower end of the cylinder 26 is closed by a conical wall 29 which has a central opening 28 therein.

The various parts described, with the exception of the pins 18, which are of metal, are made of polyethylene, or some similar type of plastic. I have found that polyethylene is a very desirable form because it is sufficiently resilient to resist breakage, is substantially impervious to moisture, and has very good insulating properties, besides being easy to seal in the desired places by the application of heat.

As previously stated, fundamentally, an ionization chamber is a form of electrical condenser. The chamber under discussion is formed with a predetermined capacity and/or volume and the surfaces are either conductive or rendered so by coating with a suitable conducting material which will emit the desired photo-electrons to cause the proper ionization of the gas, which may be air, contained in the chamber.

In order to more clearly illustrate the manner in which the coatings are applied, the thickness thereof, as shown in the drawings, is exaggerated. It will be appreciated that this coating is, however, relatively thin, and that the showing is for the purpose of clarifying the disclosure only.

The separate elements are coated prior to assembly, and the coating may be of collodial graphite in a suitable binder to cause adequate adherence.

The chamber 10 is coated on the interior as indicated at 31, the coating extending down on the under side of the flange 11 and the inner side of the rim 12. The flange 20 is, likewise, coated on most of its upper surface, around the edge and upward on the inside of the cylinder spaced from the top. This coating, when the chamber is finally assembled, contacts with the coating on the inside of the chamber 10 to form a continuous conductive surface which constitutes the outer electrode. A lead 32 extends from the coating, being secured to the underside of the flange 20, downward to one of the pins 18 to which it is electrically connected.

It will be noted that the coating 31 on the flange 20 does not extend over to the cylinder 22, but is provided with a gap 34, which gap extends around the cylinder 22 and electrically isolates the coating from the one about to be described.

The inner cylinder 22 is likewise coated on its outer surface as indicated at 36. This coating covers the entire exterior surface of the cylinder and the top 23, ending at the edge of the aperture 24. Likewise, the interior of the inner cylinder 26 is coated as indicated at 36' from its upper edge downward to the inwardly extending part 29. The exterior is provided with a coating 31 which is connected at 31' to the coating on the interior of the cylinder 22. The coatings 36' on the interior of the cylinder 26, and 36, on the exterior of the cylinder 22, are electrically connected to each other by a wire 40 which extends coaxially through the inner cylinder, a wire 41 connecting it to the inner cylinder, and upward through the aperture 24. The portion of the wire which extends through the aperture is twisted to form a loop 42 which holds loosely a shorting ring 43, also of wire. The wire then extends down at 40' and connects to the outer coating 36 on the cylinder 22.

The other end of the wire 40, interiorly of the cylinder 26, extends downward and is connected directly to the grid 44 of the tube 45. The tube 45 which may be an electrometer tube is so arranged that the press containing the grid lead extends into the aperture 28 in the bottom of the cylinder 26 forming a non-ionizable connection.

The other leads from the tube which may include the filament and plate leads are connected to the other pins 18.

I have found that after the coating has been applied and the wiring completed, the assembly may be heat sealed by simply welding the flanges 12 and 13 together. This may be effected if desired with an ordinary torch. It will be appreciated that the seal may be made in other ways, however; for instance, the flanges could be clamped together with a sealing ring should it be desired.

After assembly, the same may be inserted in a socket such as an ordinary tube socket in exactly the same manner as a vacuum tube.

It will be noted that the coating 31 on the various parts provide one conducting wall of the chamber and the coating 36 the other wall, and the only connections to the chamber which extends exteriorly of the device is the connection 32 to the outer wall 31. The inner wall 36 is completely isolated from the exterior and the only connection is through the electron stream within the tube when the device is operating.

In its upright position, the ring or loop 43 hangs down out of contact with the coating 31. If, however, it should be desired to short circuit the coating 36 to 31, it is only necessary to turn the device upside down, in which event the loop 43 carried by the loop 42 will connect the two coatings together equalizing the difference of potential therebetween.

It will be noted that the construction is such that no critical circuit leads between the vacuum tube and the chamber are exposed and that, therefore, when subjected to radiation, no ionization will occur at undesired places which will affect the operation of the device.

It will be further noted that, with this construction, the device may be utilized in places where even though it is subject to contamination as a whole, the critical parts are enclosed and cannot be contaminated. Should the exterior become contaminated with a substance which would affect its operation, it can be quickly removed and washed without any effect upon the interior components.

Figures 2, 3:
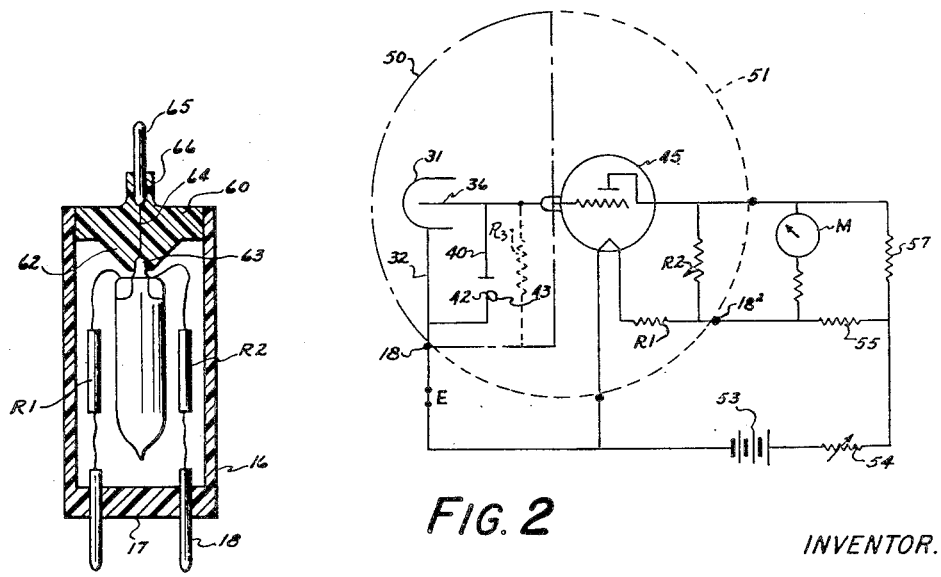
Fig. 2 is a schematic diagram showing the manner in which the device may be incorporated in a measuring or recording circuit.
Fig. 3 is a view of a modified form of the invention.

The circuit diagram of Fig. 2 illustrates one manner of utilization of the device. It will be appreciated, however, that the illustration is merely by way of an example and that many other manners in which the device may be used will be apparent to those versed in the art.

As shown in the Fig. 2, the dash-dot line 50 circumscribes the portions contained within the ionization chamber. The outer electrode 31 is connected by the lead 32 to the pin 18. The inner electrode is connected to the grid lead of its vacuum tube 45 by the lead 40, the press of the tube extending into the ionization chamber. The dotted line 51 circumscribes the parts contained within the bottom portion of the device. The plate and filament leads also extend to pins 18.

The tube filament heating battery 53 is connected through a variable resistance 54 and the resistors 55 exteriorly of the tube to the pin $18^2$. Also connected in the filament lead interiorly is the resistance $R_1$ which is a balancing resistor, the value of which is determined by the particular tube being used.

At this time it would be well to point out that the device being a unit, the critical components may be standardized during manufacture, thus enabling the complete units to always have the desired characteristics permitting one unit to be substituted for another in a complete apparatus, and because of standardization always assuring that the apparatus will operate properly even though a new unit is substituted. For instance, the slight variation among vacuum tubes can be determined at the factory and the proper resistances $R_1$ and $R_2$ inserted to provide the desired characteristics under controlled condition.

It will be noted that resistor $R_1$ in the filament lead and resistor $R_2$ across the plate and filament circuit may be balancing resistors disposed inside the chamber away from contaminating atmospheres and which compensate for or balance the circuit in the desired manner.

A change in chamber potential is indicated by the meter in the plate circuit of the vacuum tube.

When a voltage source is supplied at E and the device inverted to connect the shorting ring 43 directly to the grid of the tube and the source of the potential is changed between known values, the reading on the meter M will furnish an indication of the sensitivity of the circuit, enabling the operator to determine if the components are properly operating. As previously explained, the device may be shorted by the ring 43 for the elimination of the charge or for equalizing the potential difference between the electrodes by simply inverting the device. Furthermore, by supplying a field potential at E, and providing a grid resistor as indicated by the dotted line $R_3$ in Fig. 2, a rate meter is provided whereby the intensity of the radiations at any particular moment may be measured.

In Fig. 3 I have shown another modification of my invention wherein the vacuum tube and certain of its critical circuit components are enclosed in a chamber similar to that at the lower part of Fig. 1.

In this case, the shell 16 closed by the lower wall 17 and having the base pins 18 is provided. The leads from the plate and filament or screen grid may be connected from the base of the tube through the resistors $R_1$ and/or $R_2$ to the pins 18. The upper end of the chamber is closed by a plug 60 which has its periphery heat sealed to the chamber wall. A downwardly extending projection 62 is provided, the end of which embraces the grid exit portion 63 of the press of the tube which extends into the projection and is sealed therein. A lead 64 extends through the plug and connects the grid of the tube to a pin 65 as carried by a projection 66 comprising an outwardly extending portion of the plug 62 of the tube which extends into the projection and is sealed therein.

As previously stated, this enables devices to be constructed in production where variations in the characteristics of tubes may be compensated for by insertion of the critical circuit balancing components in the chamber with the tube. This enables a device to be supplied to the industry having substantially the same operating characteristics. Furthermore, enclosing the tube and the described components in a substantially moisture proof container where they cannot become contaminated is a distinct advantage. These devices may be substituted one for the other in circuits where they are used, knowing that the circuit will not be changed in its operating characteristics due to the differences in tubes. This is particularly desirable in the measurement of small currents or voltages such as are encountered in electrometer circuits or as are involved in instruments for measuring radiations such as are encountered in nuclear physics.

It will be noted that the grid lead, which is a critical connection from the condenser to the tube, is completely enclosed, thus eliminating any possibility of ionization and resultant leakage occurring between the elements. The construction permits a minimum of grid capacity to be realized when the condenser is eliminated, thus enabling a higher degree of sensitivity to be obtained.

It will also be appreciated that although I have described the conductive surface as being a coating, it could be of a separate material fitting closely to the surface. Such a material could be metal or paper impregnated with carbon or boron, the selection of material being determined by the type of radiations being contemplated.

Having thus described my invention, I am aware that numerous and extensive departures may be made therefrom without departing from the spirit or scope of my invention.

I claim:

1. An apparatus of the class described comprising a housing having a conductive coating on its interior, a center cylinder having a conductive coating on its exterior, a flange for said center cylinder engaged with said housing for holding the center cylinder in position, an inner cylinder disposed in said cylinder and having a bottom wall disposed in substantially the same plane as said flange, a base formed with a flange disposed in engagement with the flange on said cylinder and said housing and formed with a chamber below said housing, connector means extending from the bottom of said chamber, a vacuum tube disposed in said chamber and having a grid lead extending through said bottom wall into said cylinder and connector means connecting said grid lead to said conductive coating on said center cylinder.

2. An apparatus of the class described comprising a housing having a conductive coating on its interior, a cylinder having a conductive coating on its exterior, a flange for said cylinder engaged with said housing for holding the cylinder in position, an inner cylinder disposed in said first cylinder and having a bottom wall disposed in substantially the same plane as said flange, a base formed with a flange disposed in engagement with the flange on said cylinder and said housing and formed with a chamber below said housing, connector means extending from the bottom of said chamber, a vacuum tube disposed in said chamber and having a grid lead extending through said bottom wall into said cylinder and connector means connecting said grid lead to said conductive coating on said first cylinder, said housing, cylinders and base being formed of a moisture proof plastic having high surface resistance.

3. An apparatus of the class described comprising a cup shaped housing having a conductive coating on its interior, a cylinder having a conductive coating on its exterior, a flange for said cylinder engaged with said housing for holding the cylinder in position, a second cylinder disposed in said first cylinder and having a bottom wall disposed in substantially the same plane as said flange, a base formed with a flange disposed in engagement with the flange on said cylinder and said housing and formed with a chamber below said housing, connector means extending from the bottom of said chamber, a vacuum tube disposed in said chamber and having a grid lead extending through said bottom wall into said cylinder and connector means connecting said grid lead to said conductive coating on said center cylinder, said housing, cylinders and base being formed of a moisture proof plastic having high surface resistance, said housing, and cylinder being provided with a homogeneous seal at their meeting places to provide a sealed, air tight moisture proof container.

4. An apparatus of the class described comprising a housing including a cup shaped portion having a conductive coating on its interior, a cylinder having a conductive coating on its exterior, a flange for said cylinder engaged with said cup for holding the cylinder in position, an inner cylinder disposed in said first cylinder and having a bottom wall disposed in substantially the same plane as said flange, a base formed with a flange disposed in engagement with the flange on said cylinder and said cup and formed with a chamber below said cup, connector means extending from the bottom of said chamber, a vacuum tube disposed in said chamber and having a grid lead extending through said bottom wall into said cylinder and connector means connecting said grid lead to said conductive coating on said first cylinder; said cup, cylinders and base being formed of a moisture proof plastic having high surface resistance, said cup, cylinder and base being provided with a homogeneous seal at their meeting places to provide a sealed, air tight moisture proof container; said connector means extending in spaced relation to said condutive coating on said cup, and means loosely carried thereby normally out of contact with the coating on the cup when in an upright position adapted to connect said connector means to the cup when in an inverted position.

5. An apparatus of the class described including a housing formed to provide a chamber at one end, said chamber being formed to provide an outer electrode of cup shape, an inner electrode in the form of a cylinder disposed in coaxial relation to the outer electrode, a second chamber for said housing and a vacuum tube disposed therein having a press extending into said first chamber, a cylindrical shield inside of the inner electrode and connected to outer electrode, a grid lead for said vacuum tube extending through the shield and beyond inner electrode, a shorting ring carried on end of the grid lead and electrically connected to inner electrode, said ring being so supported that upon tilting of the device it will have electrical contact with the outer electrode.

6. An apparatus of the class described including a polyethylene housing formed to provide a chamber at one end, said chamber being of cup shape and having a conductive coating on its interior to provide an outer electrode, an inner electrode in the form of a polyethylene cylinder disposed in coaxial relation to the outer electrode and having a conductive coating on its exterior electrically isolated from said first coating, a second chamber for said housing and a vacuum tube disposed therein having a press and a grid lead extending therethrough, said press extending into upper chamber, a second cylinder of polyethylene inside of the inner electrode provided interiorly and exteriorly with a conductive coating and connected to outer electrode, said grid lead extending through sad shield and beyond the inner electrode and electrically connected to the inner electrode, said grid lead extending in proximity to the outer electrode and formed to movably support a shorting ring, said ring being so supported that upon tilting of the device it will have electrical contact with the outer electrode.

7. An ionization chamber including an outer electrode surrounding an inner electrode, means for connecting one electrode to the other to equalize the potential difference therebetween comprising a connector member disposed inside the chamber and electrically connected to one of the electrodes and support means supporting said member, said member being of a length to contact the other electrode and arranged to contact the other electrode upon tilting of the chamber.

8. An ionization chamber including an outer electrode, an inner electrode disposed inside of and in spaced relation to the outer electrode, a lead wire for said inner electrode extending coaxially therethrough, means for connecting said electrodes together disposed inside said chamber and comprising a movable element movably supported by said lead wire in close proximity to a point on the other electrode and movable upon tilting of the chamber to establish connection therebetween.

JOHN A. VICTOREEN.

REFERENCES CITED

The following references are of record in the file of this patent:

UNITED STATES PATENTS

| Number | Name | Date |
|---|---|---|
| 1,790,313 | Levin | Jan. 27, 1931 |
| 1,871,253 | Bauer | Aug. 9, 1932 |
| 1,923,552 | Murphy | Aug. 22, 1933 |
| 2,088,584 | Bucky | Aug. 3, 1937 |
| 2,122,222 | Vingerhoets | June 28, 1938 |
| 2,288,718 | Kallmann et al. | July 7, 1942 |
| 2,383,478 | Friedman et al. | Aug. 28, 1945 |
| 2,405,572 | Friedman | Aug. 13, 1946 |
| 2,416,702 | Krasnow | Mar. 4, 1947 |
| 2,434,297 | Test et al. | Jan. 13, 1948 |

OTHER REFERENCES

Review of Scientific Instruments—vol. 17, No. 9, Sept. 1946, pp. 323–333.